(12) United States Patent
Matsumoto (10) Patent No.: US 8,872,805 B2
(45) Date of Patent: Oct. 28, 2014

(54) HANDWRITING DATA GENERATING SYSTEM, HANDWRITING DATA GENERATING METHOD, AND COMPUTER PROGRAM PRODUCT

(75) Inventor: Shigeyuki Matsumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 629 days.

(21) Appl. No.: 13/046,102

(22) Filed: Mar. 11, 2011

(65) Prior Publication Data

US 2011/0234549 A1 Sep. 29, 2011

(30) Foreign Application Priority Data

Mar. 26, 2010 (JP) ................................ 2010-073272

(51) Int. Cl.
*G06F 3/033* (2013.01)
*G06F 3/0354* (2013.01)
*G06F 3/0488* (2013.01)

(52) U.S. Cl.
CPC ........ *G06F 3/04883* (2013.01); *G06F 3/03545* (2013.01)
USPC .......................................... 345/179; 345/156

(58) Field of Classification Search
CPC ... G06F 3/038; G06F 3/0383; G06F 3/04883; G06F 3/03545
USPC ......................................... 345/156, 179–184
See application file for complete search history.

(56) References Cited

U.S. PATENT DOCUMENTS

| | | | | |
|---|---|---|---|---|
| 5,478,976 A | * | 12/1995 | Kano | 178/18.01 |
| 5,612,720 A | * | 3/1997 | Ito et al. | 345/179 |
| 5,809,310 A | * | 9/1998 | Fukuda et al. | 713/300 |
| 6,329,991 B1 | * | 12/2001 | Fukuda et al. | 345/629 |
| 7,466,040 B2 | * | 12/2008 | Bruwer | 307/116 |
| 8,362,910 B2 | * | 1/2013 | Lee | 340/636.19 |

FOREIGN PATENT DOCUMENTS

| | | |
|---|---|---|
| CN | 1356623 A | 7/2002 |
| JP | A-07-325658 | 12/1995 |
| JP | 08234873 A * | 9/1996 |
| JP | A-8-314618 | 11/1996 |
| JP | A-9-101852 | 4/1997 |
| JP | A-09-212285 | 8/1997 |
| JP | A-2007-102800 | 4/2007 |
| JP | A-2008-139991 | 6/2008 |

OTHER PUBLICATIONS

English Language Machine Translation of JP-08234873A.*

* cited by examiner

*Primary Examiner* — Jason Mandeville
(74) *Attorney, Agent, or Firm* — Oliff PLC (57) ABSTRACT

A handwriting data generating system includes: a handwriting device that is used to handwrite information on a display surface on which an image is displayed; and a handwriting data generating device that generates handwriting data for displaying the handwriting of the handwritten information on the display surface, wherein the handwriting device includes a signal transmitting unit that transmits a signal indicating at least one of a position and a condition of the handwriting device, and the handwriting data generating device includes: a handwriting data generating unit that generates the handwriting data; and a handwriting data changing unit that changes the handwriting data so as to display the handwriting on the display surface in a different display format depending on details of the signal.

14 Claims, 8 Drawing Sheets

HANDWRITING DATA GENERATING SYSTEM, HANDWRITING DATA GENERATING METHOD, AND COMPUTER PROGRAM PRODUCT

CROSS REFERENCE

The entire disclosure of Japanese Patent Application No. 2010-073272, filed Mar. 26, 2010 is expressly incorporated herein by reference.

BACKGROUND

1. Technical Field

The present invention relates to a handwriting data generating system, a handwriting data generating method, and a computer program product, and more particularly, to a handwriting data generating system, a handwriting data generating method, and a computer program product, which can generate handwriting data for displaying the handwriting of information, which has been handwritten onto an image displayed on a display surface with a handwriting device such as an electronic pen, on the display screen by the use of a handwriting data generating device.

2. Related Art

In the past, characters or figures were physically written on a blackboard or a whiteboard by the use of a pen or a marker. Recently, a handwriting input system has been known which can detect the handwriting of characters or the like handwritten to a recording surface including a detection mechanism with an electronic pen or the like in real time and can display the detected handwriting on a screen of a display device (for example, see JP-A-2008-139991).

Like SMART Board (registered trademark) made by Japan Smart Technologies, a system has also been known in which in a state where an image of characters, pictures, figures, or graphics are projected onto a panel using a liquid crystal projector connected to a computer, information handwritten to a coordinate input/detection device (writing surface) disposed in front of a projection surface (display surface) of the panel with a dedicated pen or the like is input to the computer, the handwritten information and image data are synthesized by the computer, and the synthesized image is displayed on the projection surface in real time by the use of the liquid crystal projector.

However, in the system disclosed in JP-A-2008-139991 in which the recording surface detects a signal wirelessly output from the electronic pen, when the remaining level of a battery mounted on the electronic pen decreases or the intensity of the signal received from the electronic pen decreases, characters or the like may not be appropriately written. Therefore, methods of notifying a user of such a condition with a warning sound or a warning message or displaying the remaining battery level or the communication sensitivity through a display unit disposed in the electronic pen have been known.

However, when the remaining battery level decreases or the intensity of a signal received from the electronic pen decreases and the warning sound is output or the warning message is displayed, the user cannot handwrite characters or the like with concentration. Even when a display unit displaying the remaining battery level is disposed in the electronic pen, a user performing a handwriting operation while viewing the recording surface or the material at hand has to stop the handwriting to the recording surface at the time of checking the details displayed on the display unit.

SUMMARY

According to an aspect of the invention, there is provided a handwriting data generating system including: a handwriting device that is used to handwrite information on a display surface on which an image is displayed; and a handwriting data generating device that generates handwriting data for displaying the handwriting of the handwritten information on the display surface. The handwriting device includes a signal transmitting unit that transmits a signal indicating at least one of a position and a condition of the handwriting device. The handwriting data generating device includes: a handwriting data generating unit that generates the handwriting data; and a handwriting data changing unit that changes the handwriting data so as to display the handwriting on the display surface in a different display format depending on the details of the signal.

According to this handwriting data generating system, a user performing a handwriting operation can easily see the state of the handwriting device, for example, a state where the remaining level of the battery is low, on the basis of the change of the handwriting of a character or the like being handwritten.

In the handwriting data generating system, the signal may include information indicating a remaining level of the battery of the handwriting device, and the handwriting data changing unit may change the handwriting data so as to display the handwriting on the display surface in the different display format depending on the remaining level of the battery.

According to this configuration, a user performing a handwriting operation can easily see the decrease in the remaining battery level of the handwriting device on the basis of the change of the handwriting of a character or the like being handwritten.

In the handwriting data generating system, the handwriting data generating device may include a signal receiving unit that receives the signal, and the handwriting data changing unit may change the handwriting data on the basis of the reception condition of the received signal.

According to this configuration, a user performing a handwriting operation can easily see the decrease in the reception sensitivity of the signal transmitted from the handwriting device on the basis of the change of the handwriting of a character or the like being handwritten.

In the handwriting data generating system, the handwriting data changing unit may change the handwriting data so as to display the handwriting on the display surface with a different concentration depending on the details of the signal.

According to this configuration, a user performing a handwriting operation can easily see the condition of the handwriting device on the basis of the change of the handwriting of a character or the like being handwritten into a faint color.

In the handwriting data generating system, the handwriting data changing unit may change the handwriting data so as to display the handwriting on the display surface in a different linetype depending on details of the signal.

According to this configuration, a user performing a handwriting operation can easily see the condition of the handwriting device on the basis of the change of the handwriting of a character or the like being handwritten into a different linetype such as a broken line.

In the handwriting data generating system, the handwriting data changing unit may display a message corresponding to details of the signal on the display surface in response to the change of the handwriting data.

According to this configuration, a user performing a handwriting operation can see the decrease in the remaining battery level of the handwriting device on the basis of the message displayed on the display surface.

In the handwriting data generating system, the handwriting data generating device may further include a cancel signal generating unit that outputs a cancel signal to the handwriting data changing unit when a predetermined condition is satisfied, and the handwriting data changing unit may return the handwriting data to a non-changed state in response to the input of the cancel signal indicating that a predetermined condition is satisfied.

In the handwriting data generating system, the handwriting data generating device may further include a handwriting data storage unit that stores the handwriting data which is not changed yet by the handwriting data changing unit.

According to this configuration, since the handwriting data for displaying the handwriting on the display surface is changed for the purpose of warning a user but the stored handwriting data is not changed, the handwriting of a handwritten character or the like can be stored as data without any change.

The handwriting data generating system may further include a projector that projects an image based on input image data onto a projection surface, and an image obtained by superposing the handwriting data generated by the handwriting data generating unit on the image data may be projected onto the projection surface by the use of the projector.

According to this configuration, a user can handwrite characters or figures to an image projected on a screen.

According to another aspect of the invention, there is provided a handwriting data generating method of generating handwriting data for displaying the handwriting of information, which is handwritten to a display surface on which an image is displayed by the use of a handwriting device, on the display surface, wherein the handwriting data is changed so as to display the handwriting on the display surface in a different display format depending on the state of the handwriting device.

According to still another aspect of the invention, there is provided a computer program product causing a computer to serve as a handwriting data generating device that generates handwriting data for displaying the handwriting of information, which is handwritten to a display surface on which an image is displayed by the use of a handwriting device, on the display surface. The computer program product includes: a computer program that can be executed by the computer; and an information storage medium that stores the computer program so as to be read by the computer. Here, the computer program may cause the computer to serve as a handwriting data generating unit that generates the handwriting data of the handwritten information and may cause the computer to serve as a handwriting data changing unit that changes the handwriting data so as to display the handwriting on the display surface in a different display format depending on the state of the handwriting device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings. The following embodiment is not intended to limit the scope of the appended claims of the invention, but all the combinations of features in the embodiment are not necessarily essential in solution of the invention.

Figure 1:
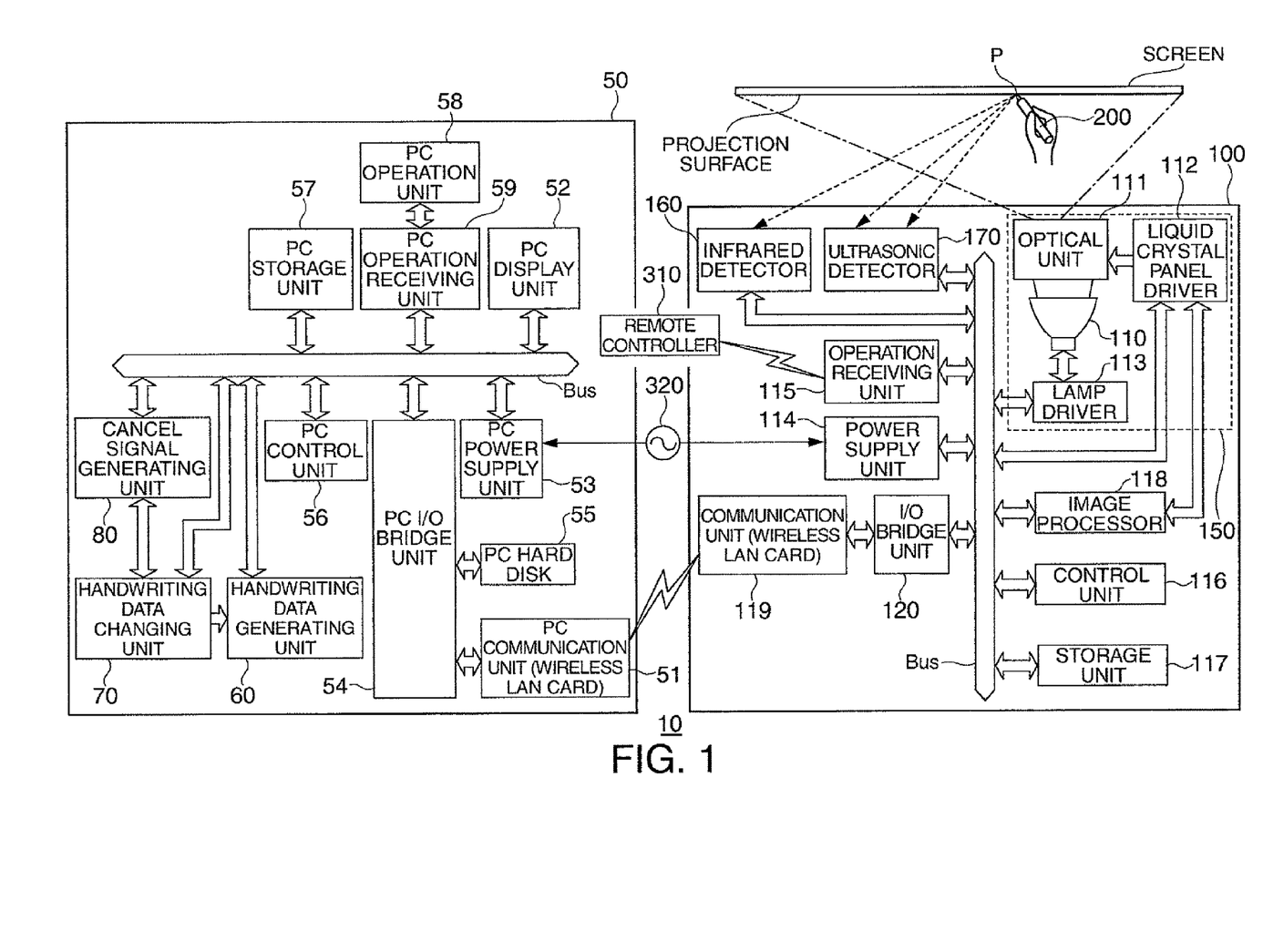
FIG. 1 is a diagram schematically illustrating the configuration of a handwriting data generating system according to an embodiment of the invention.

FIG. 1 is a diagram schematically illustrating the configuration of a handwriting data generating system 10 according to an embodiment of the invention. As shown in FIG. 1, the handwriting data generating system 10 according to this embodiment includes a projector 100, a handwriting device 200, and a personal computer (PC) 50. The PC 50 is an example of the handwriting data generating device in the claims.

The projector 100 is a so-called "three-panel liquid crystal projector" that separates light emitted from a lamp 110 as a light source into three primary color components of light (a red light component, a blue light component, and a green light component), modulates the light components by the use of liquid crystal light valves (not shown) for color components which are light modulating elements included in an optical unit 111 on the basis of image data supplied from the PC 50, synthesizes the color light components, and projects the synthesized light onto a display surface (hereinafter, referred to as a "projection surface") of a screen or the like.

The projector 100 can be operated by the use of a remote controller 310 including plural operation buttons for operating the projector 100. The projector 100 can also be operated by supplying various operation signals from the PC 50 via a communication unit 119 to be described later. The projector 100 may include an operation panel (not shown) including the same operation buttons as the remote controller 310 on the top surface of the main body.

The projector 100 includes a lamp 110, an optical unit 111, a liquid crystal panel driver 112, a lamp driver 113, a power supply unit 114, an operation receiving unit 115, a control unit 116, a storage unit 117, an image processor 118, a communication unit 119, an I/O bridge unit 120, an infrared detector 160, and an ultrasonic detector 170. The infrared detector 160 and the ultrasonic detector 170 are an example of the signal receiving unit in the claims. In the following description, the lamp 110, the optical unit 111, the liquid crystal panel driver 112, and the lamp driver 113 are referred to as a projection unit 150 as a whole.

The lamp 110 is a discharge lamp such as a high-pressure mercury lamp, a metal halide lamp, and a halogen lamp capable of providing high brightness. The optical unit 111 includes liquid crystal light valves for color light components of red, green, and blue, an integrator optical system that converts white light emitted from the lamp 110 into substantially parallel light with a stabilized brightness distribution, a separation optical system that separates white light with a stabilized brightness distribution into the color light components of red, green, and blue which are three primary colors of light and supplies the separated color light components to the liquid crystal light valves for color light components, and a synthesis optical system that synthesizes the color light components modulated for each color light component on the basis of an image signal by the liquid crystal light valves again, all of which are not shown. The optical unit 111 projects a full-color image on a screen by the use of projection light which is obtained by enlarging the full-color and substantially-parallel modulated light emitted from the synthesis optical system with a built-in projection lens.

The liquid crystal panel driver 112 supplies a drive voltage along with an image signal input from the image processor 118 to the liquid crystal light valves of the optical unit 111 and applies a projection image to the liquid crystal light valves.

The lamp driver 113 includes an igniter circuit that is supplied with power from the power supply unit 114, generates a high voltage for turning on the lamp 110, and forms a discharging path and a ballast circuit that maintains a stabilized lighting state after the turning-on, all of which are not shown.

The power supply unit 114 guides AC power from an external power source 320 from a plug and supplies the units of the projector 100 with a DC voltage stabilized by performing transforming, rectifying, and smoothing processes thereon by the use of a built-in AC/DC converter (not shown).

The operation receiving unit 115 receives an operation signal from the remote controller 310 or the PC and sends an operation start command including operation details to the control unit 116.

The control unit 116 is, for example, a central processing unit capable of performing a high-speed operating process, sends control signals triggering an operation to the units of the projector 100 in response to the operation start command from the operation receiving unit 115, and receives signals indicating setting or operation results from the units.

The storage unit 117 includes a data-rewritable nonvolatile memory such as a flash memory and a hard disk. The storage unit 117 stores various programs for controlling the operation of the projector 100, such as a starting routine for starting up the projector 100, and accompanying data. When image data (hereinafter, referred to as "projection data") of an image projected onto the projection surface of the screen by the projection unit 150 is supplied from the PC 50, the storage unit 117 receives and stores the projection data.

The communication unit 119 is a wireless LAN card corresponding to, for example, a known wireless LAN standard and transmits and receives various data to and from a PC communication unit 51 (to be described later) of the PC 50.

The I/O bridge unit 120 is mounted with a card controller corresponding to the PCMCIA (Personal Computer Memory Card International Association) for controlling the wireless LAN card of the communication unit 119.

The infrared detector 160 includes a light-receiving element (photoelectric conversion element) capable of receiving infrared light and an A/D conversion circuit and receives the infrared light emitted from a light-emitting unit 215 of the handwriting device 200. Specifically, the infrared detector 160 receives the infrared light from the light-emitting unit 215 by the use of the light-receiving element, converts the infrared light into an analog signal with a voltage value corresponding to the intensity of the received light, and outputs the analog signal to the A/D conversion circuit. The A/D conversion circuit converts the analog signal into a digital signal of H or L depending on the voltage value and outputs the digital signal. The infrared detector 160 generates and outputs light-receiving time data indicating the time of receiving the infrared light and the time of stopping the receiving of light.

In this example, as described later, the light-emitting unit 215 of the handwriting device 200 emits infrared light only when characters and the like are handwritten to the projection surface by the use of the handwriting device 200. The light-emitting unit 215 emits pulse-like light at a frequency corresponding to the remaining level of a battery mounted on the handwriting device 200 as described later. Accordingly, the light-receiving time data represents the time of handwriting characters and the like onto the projection surface by the use of the handwriting device 200 and the remaining level of the battery of the handwriting device 200.

The ultrasonic detector 170 includes two sets of an ultrasonic receiver and an A/D conversion circuit and a signal processing circuit and receives an ultrasonic signal transmitted from an ultrasonic output unit 216 (to be described later) of the handwriting device 200. Specifically, the ultrasonic detector 170 receives the ultrasonic signal from the ultrasonic output unit 216 by the use of the ultrasonic receivers, converts the received ultrasonic signal into an analog signal of a voltage value corresponding to the reception condition such as a received signal level, and outputs the analog signal to the corresponding A/D conversion circuits from the ultrasonic receivers. The A/D conversion circuits convert the analog signal into a digital signal of H or L depending on the voltage value and outputs the digital signal.

The signal processing circuit of the ultrasonic detector 170 detects a time difference between the times of receiving the ultrasonic signal in the ultrasonic receivers from the digital signal from the A/D conversion circuits for each predetermined unit time. Here, when the ultrasonic signals received by two sets of ultrasonic receivers are signals such as pulse signals or sinusoidal signals having constant periodicity, the detection of the time difference can be performed by causing the signal processing circuit to calculate a phase difference between the signals and to perform an operating process on the phase difference.

The ultrasonic detector 170 generates and outputs reception time difference data representing the detected time difference. The signal processing circuit of the ultrasonic detector 170 generates and outputs signal level data representing the reception condition (signal level) of an ultrasonic signal for each unit time, in addition to the reception time difference data. Accordingly, the reception time difference data and the signal level data output from the ultrasonic detector 170 represent an input position where characters and the like are handwritten to the projection surface by the use of the handwriting device 200 and the reception condition (signal level) of an ultrasonic signal in the ultrasonic detector 170.

The rough configuration of the PC 50 will be described below. The PC 50 includes a PC communication unit 51, a PC display unit 52, a PC power supply unit 53, a PC I/O bridge unit 54, a PC hard disk 55, a PC control unit 56, a PC storage unit 57, a PC operation unit 58, a PC operation receiving unit 59, a handwriting data generating unit 60, a handwriting changing unit 70, and a cancel signal generating unit 80. For the purpose of easy distinction from the names of the units of the projector 100, "PC" is added to the names of the elements of the PC 50 other than the handwriting data generating unit 60, the handwriting data changing unit 70, and the cancel signal generating unit 80 as described above. The PC hard disk 55 is an example of the handwriting data storage unit in the claims.

The PC communication unit 51 transmits and receives various data to and from the communication unit 119 of the projector 100. The PC display unit 52 is a display device such as a CRT or an LCD and displays, for example, an image displayed on the projection surface of the screen by the projector 100. The PC display unit 52 may display various commands or icons.

The PC power supply unit 53 guides AC power from the external power source 320 from the plug and supplies the units of the PC 50 with a DC voltage stabilized by performing transforming, rectifying, and smoothing processes thereon by the use of a built-in AC/DC converter (not shown). When the PC 50 has portability like a notebook PC, the PC power supply unit 53 may include a secondary lithium ion battery.

The PC I/O bridge unit 54 is mounted with various device controllers such as a card controller corresponding to the PCMCIA for controlling the PC communication unit 51 (the wireless LAN card) and a hard disk controller for controlling the PC hard disk 55.

The PC hard disk 55 is, for example, a hard disk corresponding to IDE and stores programs such as an OS (Operating System) as basic software or control software of the projector 100. The PC hard disk 55 may further store a network browser or various business software programs used in preparing a document or presentation.

The PC control unit 56 is, for example, a central processing unit capable of a high-speed operating process, sends control signals triggering operations of the units of the PC 50 in response to a signal from the PC operation receiving unit 59, and receives signals operation details or results from the units. The PC control unit 56 executes various programs for controlling the PC 50, such as a connection program for connection to the projector 100 and various protocol programs for performing a communication by the use of the PC communication unit 51.

The PC storage unit 57 includes a data-rewritable nonvolatile memory such as a flash memory. The PC storage unit 57 stores various programs for controlling the operation of the PC 50, such as a program executed by the PC control unit 56, and data accompanied with the programs. The programs or data may be stored in the PC hard disk 55.

The PC operation unit 58 includes a keyboard and a mouse, and receives various operation inputs of starting up and shutting down the PC 50 and displaying presentation materials. The PC operation receiving unit 59 detects an operation input to the PC operation unit 58 and sends a signal indicating the operation details to the PC control unit 56.

The handwriting data generating unit 60 receives the light-receiving time data output from the infrared detector 160 of the projector 100 and the reception time difference data and the signal level data output from the ultrasonic detector 170 via the PC communication unit 51 and stores the received data in time series. The handwriting data generating unit 60 sequentially reads the stored data and specifies the input position where a user handwrites characters or figures by the use of the handwriting device 200 on the basis of the read data. In this example, the handwriting data generating unit 60 includes a data-rewritable nonvolatile memory such as a flash memory and an operation processing circuit.

More specifically, for example, as shown in FIG. 1, when the user presses the tip of the handwriting device 200 against the projection surface of the screen to handwrite information such as characters or figures, the reception time difference data, the signal level data, and the light-receiving time data generated on the basis of the infrared light or the ultrasonic signal (hereinafter, referred to as a "signal" as a whole) transmitted from the handwriting device 200 are output from the infrared detector 160 and the ultrasonic detector 170. The handwriting data generating unit 60 calculates distances from the ultrasonic receivers of the ultrasonic detector 170 to the tip of the handwriting device 200 on the basis of the reception time difference data of the received data.

The handwriting data generating unit 60 specifies the coordinates of the position of the tip of the handwriting device 200 as a handwriting position (the position indicated by "P" in FIG. 1) on the basis of the light-receiving time data. The handwriting data generating unit 60 generates handwriting data for displaying a line with a predetermined thickness and color on a moving trace of the handwriting position on the projection surface. The handwriting data generating unit 60 synthesizes the generated handwriting data with the projection data supplied to the projector 100 from the PC 50.

The handwriting data changing unit 70 changes the handwriting data generated by the handwriting data generating unit 60 so as to project the handwriting of the characters or figures handwritten by the handwriting device 200 in a different display format depending on the data indicating the details of the signal. Here, the "project the handwriting onto the projection surface in a different display format" means a state where the handwriting is projected, for example, with thickness, color, or concentration different from the set ones.

For example, when the light-receiving time data output from the infrared detector 160 represents that the remaining battery level of the power supply unit 212 is lower than a predetermined warning level, the handwriting data changing unit 70 changes the handwriting data so as to display the handwriting of the character being handwritten with the handwriting device 200 in a line with a color lighter than that of the handwriting of the characters having been handwritten hitherto. When the signal level data output from the ultrasonic detector 170 represents that the signal level of the ultrasonic signal received by the ultrasonic detector 170 is lower than a predetermined level (warning level), that is, the reception intensity of the ultrasonic signal gets close to a detectable lower limit level, the handwriting data changing unit 70 changes the handwriting data so as to display the handwriting of the characters being handwritten with the handwriting device 200 in a linetype different from the handwriting of the characters having been handwritten hitherto.

The handwriting data changing unit 70 displays a message corresponding to the details of the signal on the projection surface in response to the change of the handwriting data. For example, when the signal level data represents that the signal level of the ultrasonic signal received by the ultrasonic detector 170 is lower than a predetermined level (warning level), the handwriting data changing unit 70 changes the projection data so as to project a message indicating that the reception intensity of the ultrasonic signal gets close to the detectable lower limit level onto the projection surface.

When a predetermined condition is satisfied, the cancel signal generating unit 80 outputs a cancel signal to the handwriting data changing unit 70. More specifically, the cancel signal generating unit 80 acquires a handwriting data changing history from the handwriting data changing unit 70 and outputs to the handwriting data changing unit 70 the cancel signal for returning the changed part of the handwriting data to the non-changed state, for example, when a predetermined time lapses after the changing. Instead, the cancel signal generating unit 80 sets a unit of handwriting to a part handwritten until the tip of the handwriting device 200 is separated from the projection surface after once coming in contact with the projection surface and outputs to the handwriting data changing unit 70 the cancel signal for returning the changed part of the handwriting data previous to the unit of handwriting of the character being currently handwritten to the non-changed state. When receiving the cancel signal, the handwriting data changing unit 70 causes the handwriting data generating unit 60 to generate the handwriting data in which the changed part of the handwriting data is returned to the non-changed state depending on the details.

In this example, the handwriting data generated by the handwriting data generating unit 60 is stored in the PC hard disk 55. Here, the non-changed handwriting data, not the handwriting data changed by the handwriting data changing unit 70, is stored in the PC hard disk 55. Accordingly, since the handwriting data for displaying the handwriting on the projection surface is changed for the purpose of warning the user but the handwriting data stored in the PC hard disk 55 is not changed, the handwriting of the handwritten characters can be stored without any change. The details of the handwriting data changed by the handwriting data changing unit 70 may be stored as additional data in the PC hard disk 55.

Figure 2:
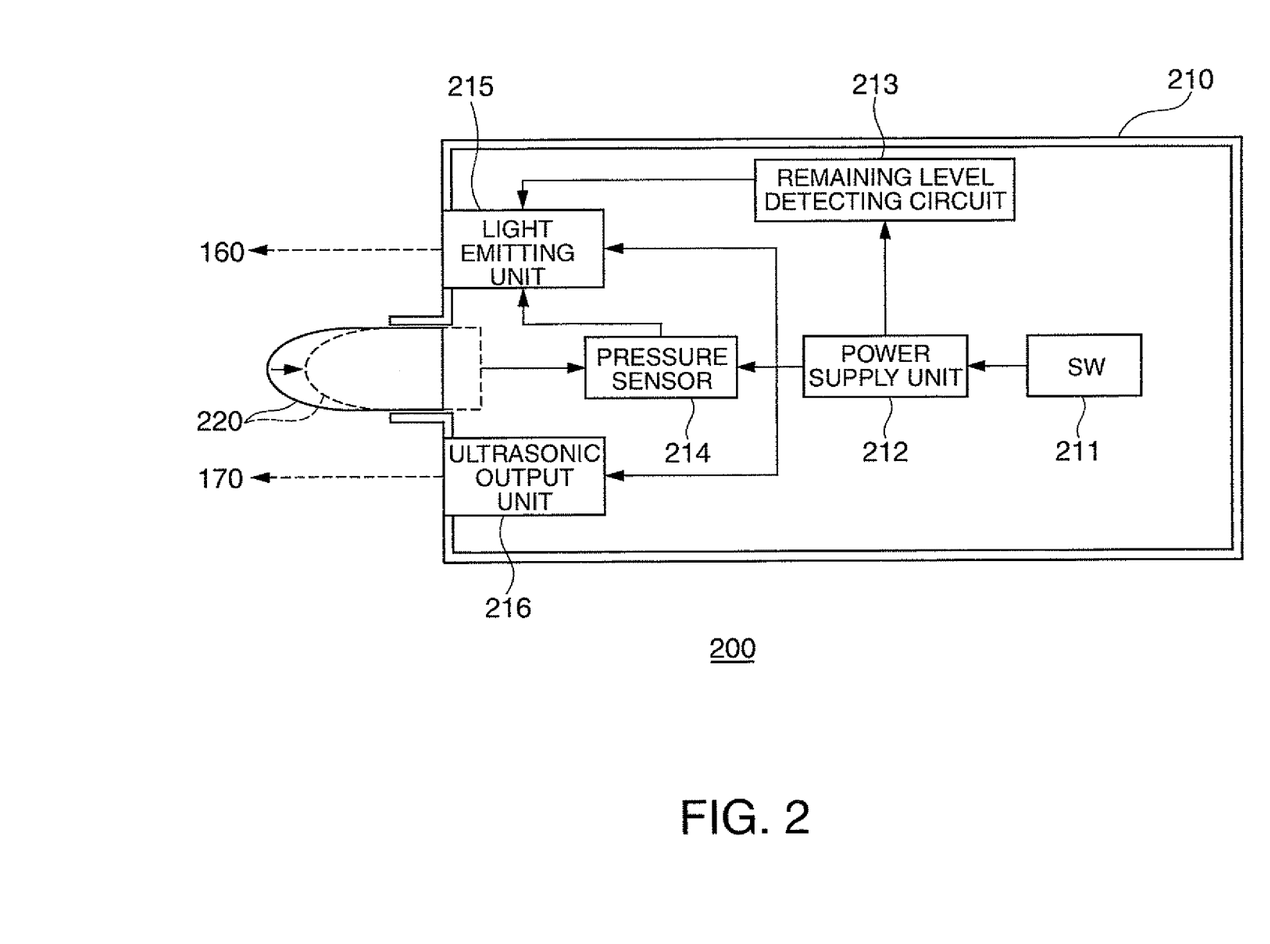
FIG. 2 is a diagram schematically illustrating the configuration of a handwriting device.

The configuration of the handwriting device 200 used to handwrite information such as characters or figures to the projection surface of the screen onto which an image is projected will be described below.

FIG. 2 is a diagram schematically illustrating the configuration of the handwriting device 200. The handwriting device 200 is, for example, a portable electronic pen with the same size as a whiteboard marker and includes a device body 210 and a protrusion section 220 protruding from the device body 210 as shown in FIG. 2. The device body 210 includes a switch 211, a power supply unit 212, a remaining level detecting circuit 213, a pressure sensor 214, a light-emitting unit 215, and an ultrasonic output unit 216. The light-emitting unit 215 and the ultrasonic output unit 216 are an example of the signal transmitting unit in the claims.

The protruding section 220 can be inserted into the device body 210 up to the position indicated by a broken line in FIG. 2. An end of the protruding section 220 close to the device body 210 is provided with an elastic member (not shown) such as a coil spring and thus an elastic force in the direction in which the protruding section is pushed out of the device body 210 is applied to the protruding section 220 by the elastic member. Accordingly, when the protruding section 220 is separated from the projection surface in the state where the protruding section 220 comes in contact with the projection surface and is pressed into the device body 210, the protruding section is pushed out of the device body 210 and is returned to the original position.

The switch 211 includes a switch for permitting or inhibiting the supply of power to the units of the handwriting device 200 from the power supply unit 212. The switch 211 may include switches for performing various functions of the handwriting device 200 or a switch for changing the setting of the line thickness or the line color of the handwriting displayed on the projection surface.

The power supply unit 212 is a power source of the handwriting device 200 and includes a battery charged with power to be supplied to the units of the handwriting device 200 and a low-voltage circuit stabilizing the voltage from the battery. The battery may be a primary battery such as a manganese battery or an alkali battery, but a secondary battery such as a lithium battery, a lithium polymer battery, a lithium ion battery, a nickel hydrogen battery, or a nickel cadmium battery can be preferably used. It is preferable that the power supply unit 212 can be easily replaced.

The remaining level detecting circuit 213 detects the power supplied to the units of the handwriting device 200 from the power supply unit 212. More specifically, the remaining level detecting circuit 213 includes a voltage detecting circuit detecting the output voltage of the power supply unit 212 and a signal detecting circuit, and outputs a signal indicating the magnitude of the output voltage of the power supply unit 212 to the light-emitting unit 215 from the signal output circuit.

The pressure sensor 214 detects that the protruding section 220 is pressed into the device body 210. The pressure sensor 214 includes, for example, a piezoelectric element and a voltage amplifier circuit and outputs a signal to the light-emitting unit 215 in response to the pressing of the protruding section 220 into the device body 210. The configuration for detecting the pressing of the protruding section 220 into the device body 210 is not limited to this example. For example, a sensor detecting the variation of the protruding section 220 based on the pressing into the device body 210 may be provided instead of the pressure sensor 214.

In this example, the light-emitting unit 215 includes a light-emitting diode emitting infrared light in accordance with the power supplied from the power supply unit 212 and a control circuit controlling the power supplied to the light-emitting diode from the power supply unit 212 on the basis of the signals supplied from the pressure sensor 214 and the remaining level detecting circuit 213. Specifically, the control circuit permits the supply of power from the power supply unit 212 to the light-emitting diode in response to the input of the signal from the pressure sensor 214.

The control circuit controls the power supplied from the power supply unit 212 on the basis of the signal from the remaining level detecting circuit 213 so as for the light-emitting diode to emit pulse-like light with a frequency corresponding to the remaining level (the magnitude of the output voltage of the power supply unit 212) of the battery of the power supply unit 212. The infrared light emitted from the light-emitting unit 215 is received by the infrared detector 160 as described above.

In this example, the emission state of the infrared light emitted when the protruding section 220 is pressed into the device body 210 is changed depending on the remaining level of the battery, but the configuration for transmitting the remaining level of the battery is not limited to this example. For example, the ultrasonic signal from the ultrasonic output unit 216 may be modulated depending on the remaining level of the battery, or the remaining level of the battery may be transmitted directly from the remaining level detecting circuit 213 in a desired signal format such as light, electromagnetic waves, or infrared light and a detector detecting the signal may be disposed in the projector 100 or the PC 50.

The ultrasonic output unit 216 outputs an ultrasonic signal with the supply of power from the power supply unit 212. The ultrasonic signal output from the ultrasonic output unit 216 is received by two ultrasonic receivers disposed in the ultrasonic detector 170 at the time corresponding to the distance difference from the ultrasonic output unit 216, as described above.

In this way, in the handwriting device 200, the light-emitting unit 215 emits infrared light only when the protruding section 220 is pressed against the projection surface. Accordingly, by detecting the infrared light from the handwriting device 200, it is possible to easily detect whether a user performs a handwriting operation on the projection surface by the use of the handwriting device 200. For example, when the user does not perform the handwriting operation by the use of the handwriting device 200 but points out a specific part of an image projected on the projection surface, only the ultrasonic signal output from the ultrasonic output unit 216 is detected. Accordingly, in this state, the handwriting data generating unit 60 of the PC 50 does not generate the handwriting data but may specify the coordinates of the position pointed out by the handwriting device 200 in the same way as handwriting.

Figure 3:
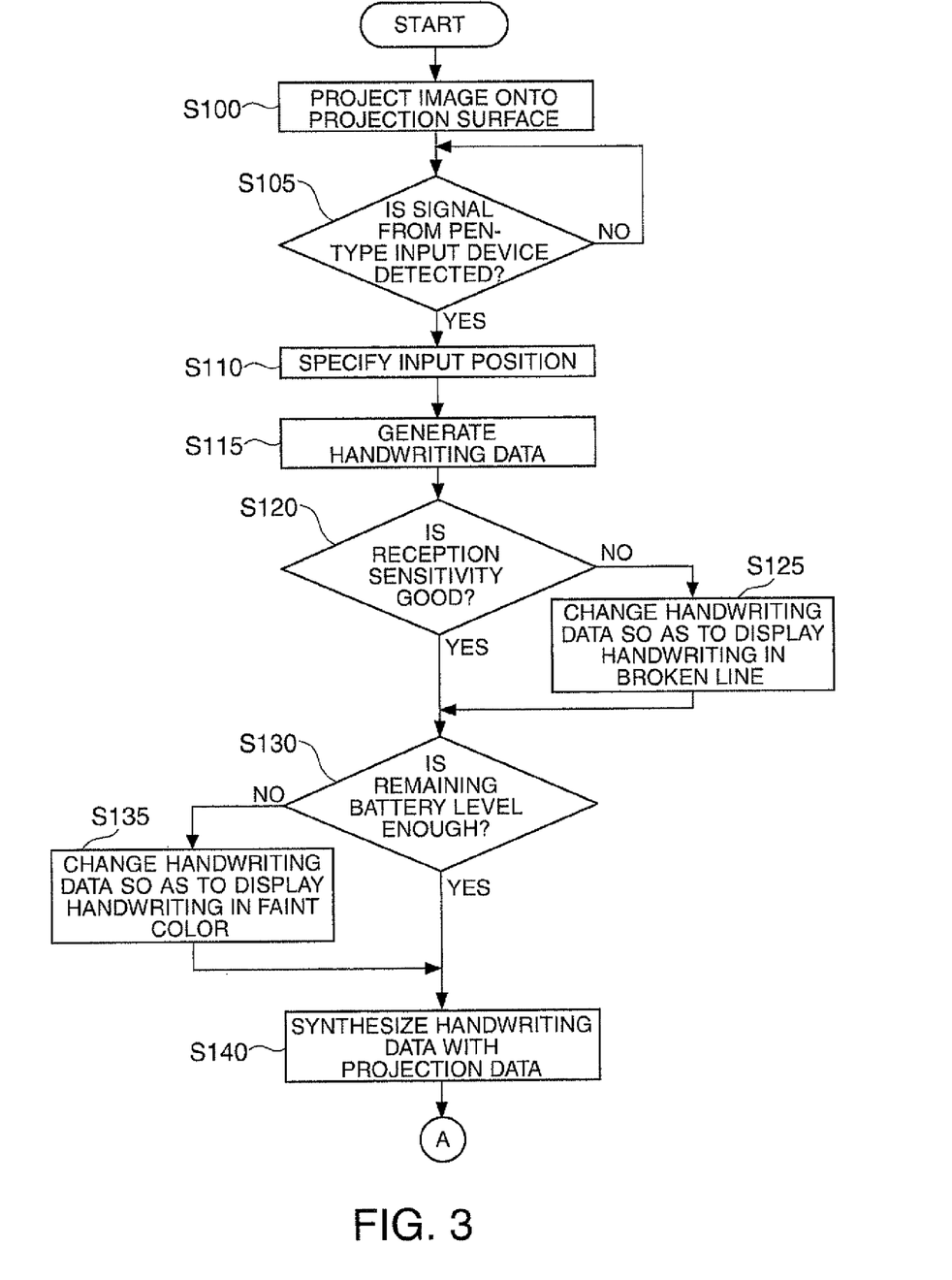
FIG. 3 is a flow diagram illustrating the flow of processes in the system at the time of handwriting characters or figures to a projection surface of a screen using the system.
Figure 4:
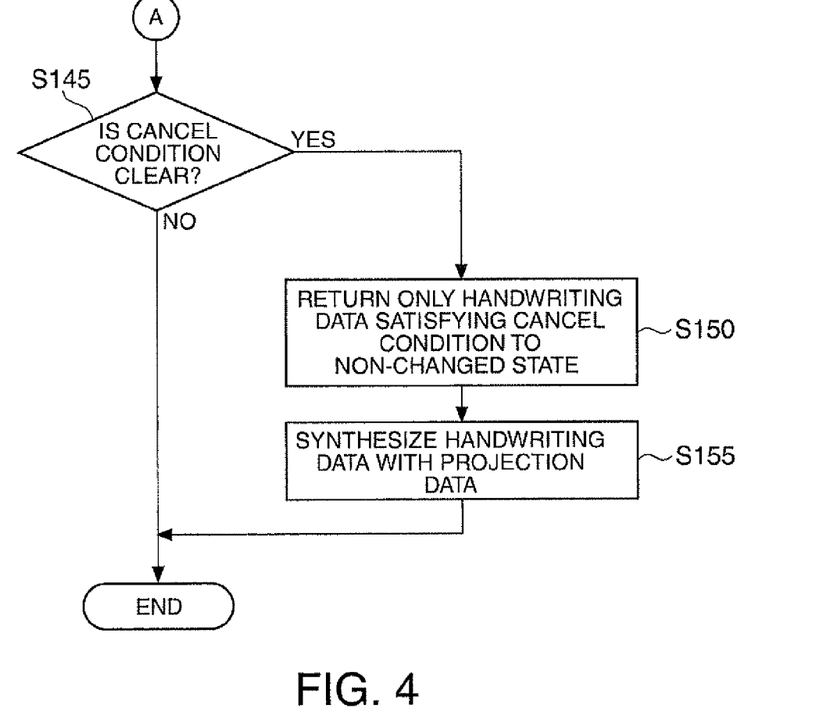
FIG. 4 is a flow diagram illustrating the flow of processes in the system at the time of handwriting characters or figures to a projection surface of a screen using the system.

FIGS. 3 and 4 show an example of the flow of processes performed by the system at the time of handwriting characters or figures to the projection surface of the screen using the system. In this flow, an image is projected onto the projection surface of the screen by the projection unit 150 of the projector 100 (step S100) and the infrared signal and the ultrasonic signal from the handwriting device 200 are detected by the infrared detector 160 and the ultrasonic detector 170 of the projector 100 (step S105).

When the infrared detector 160 and the ultrasonic detector 170 receive the infrared light and the ultrasonic signal from the handwriting device 200 (YES in step S105), the handwriting data generating unit 60 of the PC 50 specifies the handwriting position of the handwriting device 200 (step S110) and generates the handwriting data for displaying a line with a predetermined thickness or color on the moving trace of the handwriting position (step S115). The generated handwriting data is synthesized with the projection data supplied to the projector 100 from the PC 50 by the handwriting data generating unit 60. When the infrared light and the ultrasonic signal are not received at all or only the ultrasonic signal is received (NO in step S105), the handwriting data generating unit 60 does not generate the handwriting data.

The handwriting data changing unit 70 changes the handwriting data generated by the handwriting data generating unit 60 on the basis of the details of the light-receiving time data and the signal level data output from the infrared detector 160 and the ultrasonic detector 170 of the projector 100 on the basis of the signal (the infrared light and the ultrasonic signal) from the handwriting device 200 (steps S120 to S135).

Figure 5:
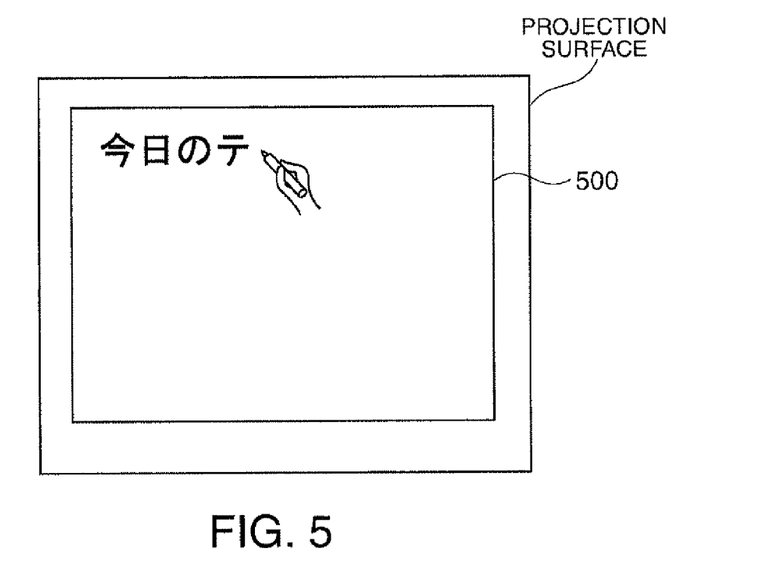
FIG. 5 is a diagram illustrating a state where a character is being handwritten to the projection surface by the use of the handwriting device.
Figure 6:
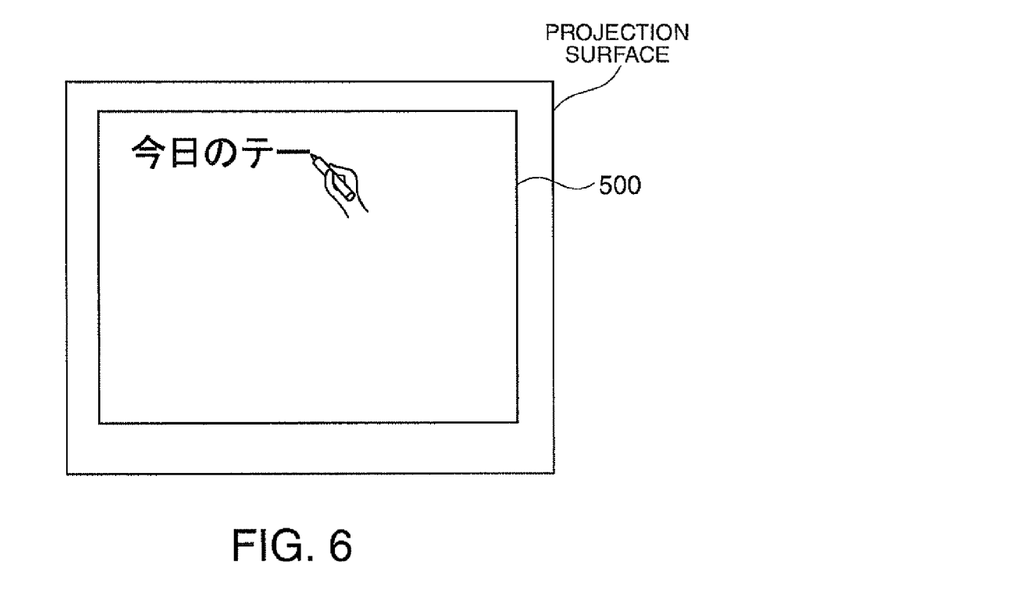
FIG. 6 is a diagram illustrating a state where a character is being handwritten to the projection surface by the use of the handwriting device.

FIGS. 5 to 10 are diagrams illustrating states where characters are handwritten to the projection surface by the use of the handwriting device 200. As shown in FIGS. 5 and 6, when the signal level data from the ultrasonic detector 170 represents that the reception condition of the ultrasonic signal is good (YES in step S120) and the light-receiving time data from the infrared detector 160 represents that the remaining battery level of the handwriting device 200 is enough (greater than a warning level) (YES in step S130), the handwriting data changing unit 70 does not change the handwriting data generated by the handwriting data generating unit 60. Accordingly, the handwriting data generated by the handwriting data generating unit 60 is synthesized with the projection data without any change and the synthesized data is projected as handwriting onto the projection surface (step S140).

On the other hand, when the signal level data from the ultrasonic detector 170 represents that the signal level of the ultrasonic signal is lower than the warning level (NO in step S120), the handwriting data changing unit 70 changes the handwriting data generated by the handwriting data generating unit 60 so as to display the handwriting of the character being handwritten with the handwriting device 200 in a broken line (step S125). At this time, the handwriting data changing unit 70 changes the projection data so as to project a message representing that the reception intensity of the ultrasonic signal gets close to the detectable lower limit level onto the projection surface.

When the light-receiving time data from the infrared detector 160 represents that the remaining battery level of the power supply unit 212 is lower than the warning level (NO in step S130), the handwriting data changing unit 70 changes the handwriting data generated by the handwriting data generating unit 60 so as to display the handwriting of the character being handwritten with the handwriting device 200 in a lighter color such as gray (step S135). At this time, the handwriting data changing unit 70 changes the projection data so as to project a message representing that the remaining battery level of the power supply unit 212 is lower than the warning level onto the projection surface.

Figure 7:
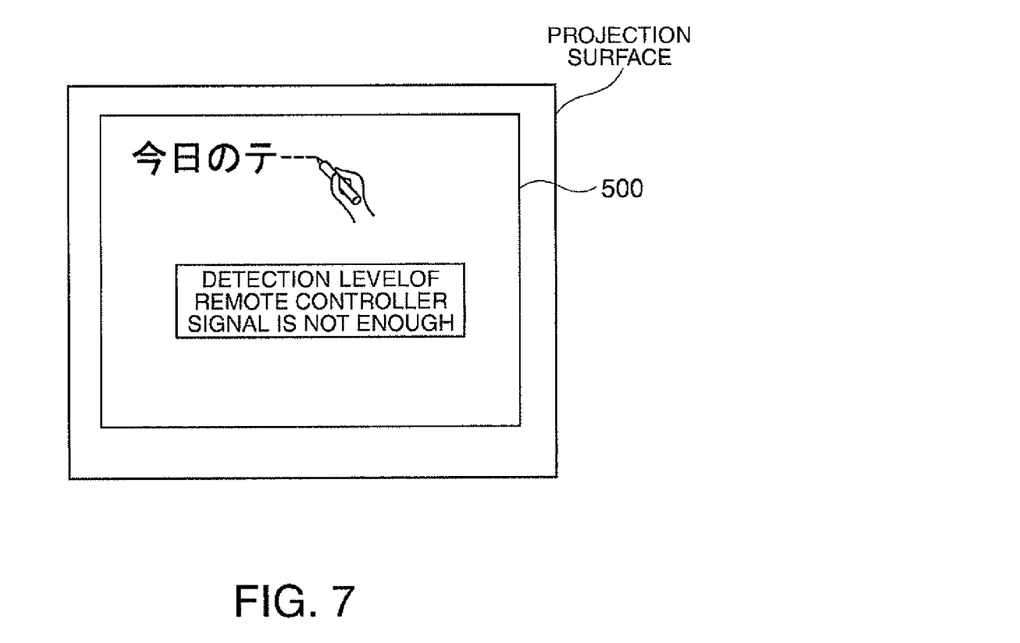
FIG. 7 is a diagram illustrating a state where a character is being handwritten to the projection surface by the use of the handwriting device.

The changed handwriting data is synthesized with the projection data by the handwriting data generating unit 60 (step S140). Accordingly, when the signal level of the ultrasonic signal received by the ultrasonic detector 170 is lower than the warning level, that is, when the communication between the handwriting device 200 and the projector 100 is out of order or the distance between the projector 100 and the handwriting device 200 increases to such an extent that the signal level of the ultrasonic signal from the ultrasonic output unit 216 is lower than the level detectable by the ultrasonic detector 170, the handwriting of the character being handwritten with the handwriting device 200 is displayed in a broken line and a warning message of "Detection Level of Remote Signal is not Enough" is projected onto the projection surface, as shown in FIG. 7. When the remaining battery level of the power supply unit 212 is lower than the warning level, the handwriting of the character being handwritten with the handwriting device 200 is displayed in a lighter color and a warning message of "Remaining Battery Level is Low" is projected onto the projection surface, as shown in FIG. 8.

When the signal level of the ultrasonic signal received by the ultrasonic detector 170 is lower than the warning level and the remaining battery level of the power supply unit 212 is lower than the warning level, the handwriting of the character being handwritten with the handwriting device 200 is displayed in a broken line and a faint color, which is not shown. At this time, both of two types of warning messages are projected onto the projection surface. When the signal level of the ultrasonic signal received by the ultrasonic detector 170 is lower than the warning level, a figure or a character indicating the reception intensity of the signal may be projected onto the projection surface instead of the warning message.

Figure 9:
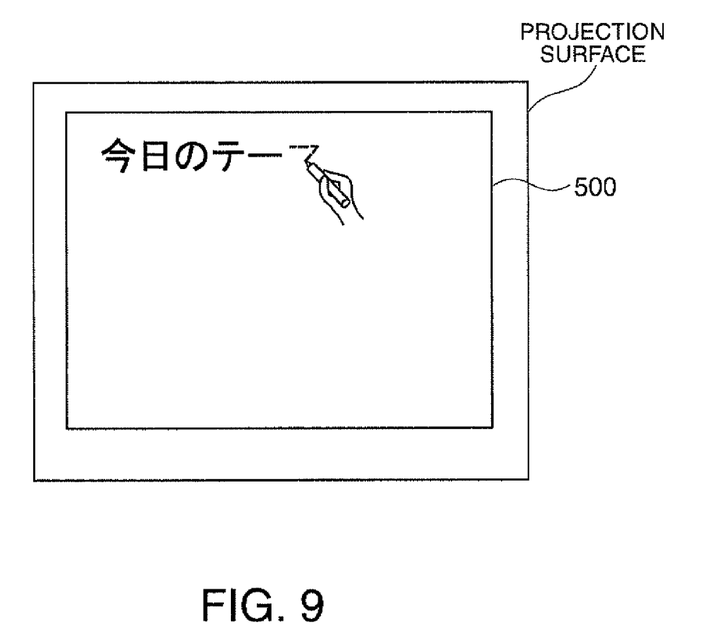
FIG. 9 is a diagram illustrating a state where a character is being handwritten to the projection surface by the use of the handwriting device.
Figure 10:
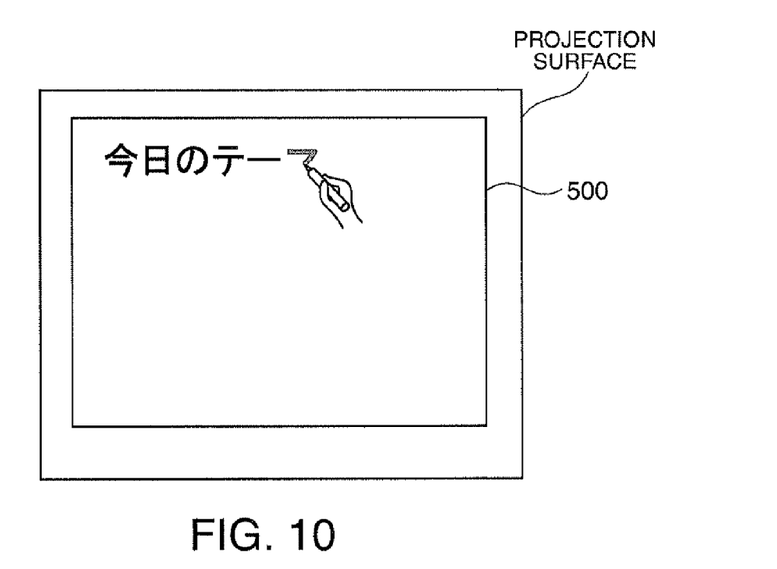
FIG. 10 is a diagram illustrating a state where a character is being handwritten to the projection surface by the use of the handwriting device.

It is assumed that the cancel signal generating unit 80 sets a condition that "the change of the handwriting data for the handwritten parts is cancelled every unit of handwriting" in the state where the handwriting of the character being handwritten with the handwriting device 200 is projected in a broken line or a faint color on the basis of the handwriting data changed by the handwriting data changing unit 70. Then, as shown in FIGS. 9 and 10, when a new unit of handwriting is handwritten in the state shown in FIGS. 7 and 8 (YES in step S145), the handwriting data for the part projected in a broken line or a faint color is returned to the non-changed state (step S150) and is synthesized with the projection data, and the synthesized data is projected (step S155). With the returning of the handwriting data to the non-changed state, the handwriting data changing unit 70 changes the projection data so as to delete the warning message. Accordingly, the warning message does not interfere with the handwriting operation.

Figure 8:
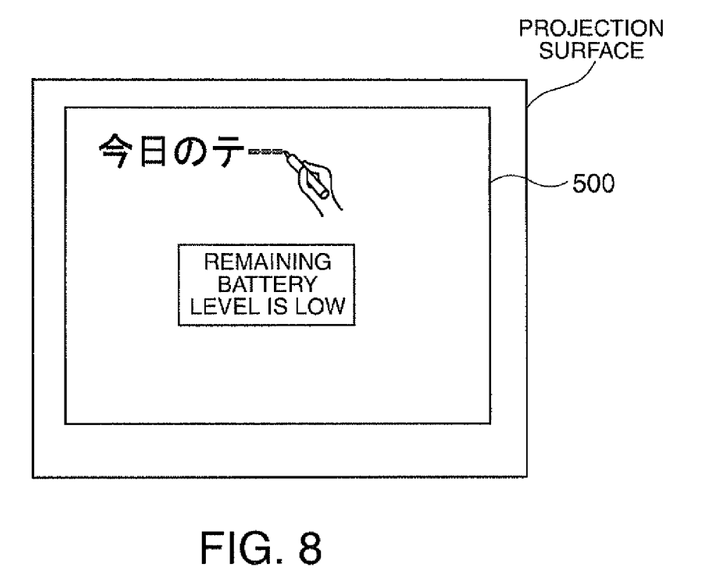
FIG. 8 is a diagram illustrating a state where a character is being handwritten to the projection surface by the use of the handwriting device.

Until a new unit of handwriting is completely handwritten in the state shown in FIGS. 7 and 8 (step S145), the changed part is not returned to the original state, but the handwriting data is sequentially returned to the non-changed state with the elapse of time when the cancel condition is set to the time after the change. In this way, the flow of processes is ended.

As described above, in the handwriting data generating system 10 according to this embodiment, a user handwriting characters or figures to the projection surface by the use of the handwriting device 200 can easily see the condition of the handwriting device 200, for example, where the remaining battery level is low from the variation of the handwriting. The user can also see that the handwriting device 200 is in such a state from the message projected onto the projection surface.

In this example, the infrared light output from the light-emitting unit 215 and the ultrasonic signal transmitted from the ultrasonic output unit 216 have been exemplified as the signal indicating the position and condition of the handwriting device 200, but the details indicated by the signal are not limited to this example. For example, a signal including information such as the internal setting of the handwriting device 200 may be transmitted from the handwriting device 200. The type of the signal transmitted from the handwriting device 200 is not limited to the infrared light and the ultrasonic signal in this example, but may be an electric wave signal of a local communication frequency band (for example, 2.4 GHz band). The change result of the handwriting data in the handwriting data changing unit 70 is not limited to the display of a broken line or a faint color in this example. For example, the handwriting data may be changed so as to change the thickness of the line of the handwriting part to be changed or to flicker the part.

In this example, the position and the condition of the handwriting device 200 are specified by receiving the infrared light and the ultrasonic signal from the handwriting device 200, but the method of specifying the position and the condition is not limited to this example. For example, when a mark or a barcode indicating position information is printed or displayed on the screen, the handwriting device 200 may read the mark or barcode and acquire the position information by capturing the image by the use of a camera or sensing the mark or barcode by the use of a sensor. In this case, the handwriting device 200 may wirelessly transmit its position information and information including the remaining battery level to the projector 100 or the PC 50 in various ways.

The method of specifying the tip position of the handwriting device 200 is not limited to this example. For example, a GPS method, an optical method, or an electromagnetic induction method may be used. In this case, an operation processing circuit calculating the position information on the basis of various detected data may be provided to the handwriting device 200. When the screen has the configuration for detecting the tip position of the handwriting device 200, the configuration for outputting an ultrasonic signal may not be provided to the handwriting device 200 as in this example, and the handwriting device may have the configuration for outputting infrared light.

Figure 11:
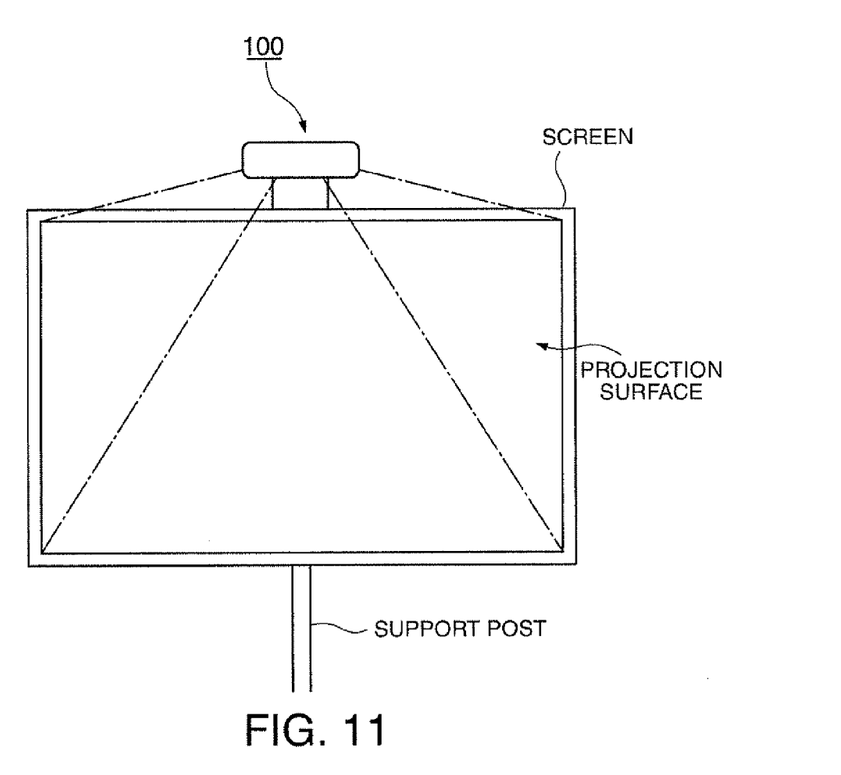
FIG. 11 is a front view illustrating a state where a projection image is projected onto the projection surface of the screen by the use of a top projection type projector.
Figure 12:
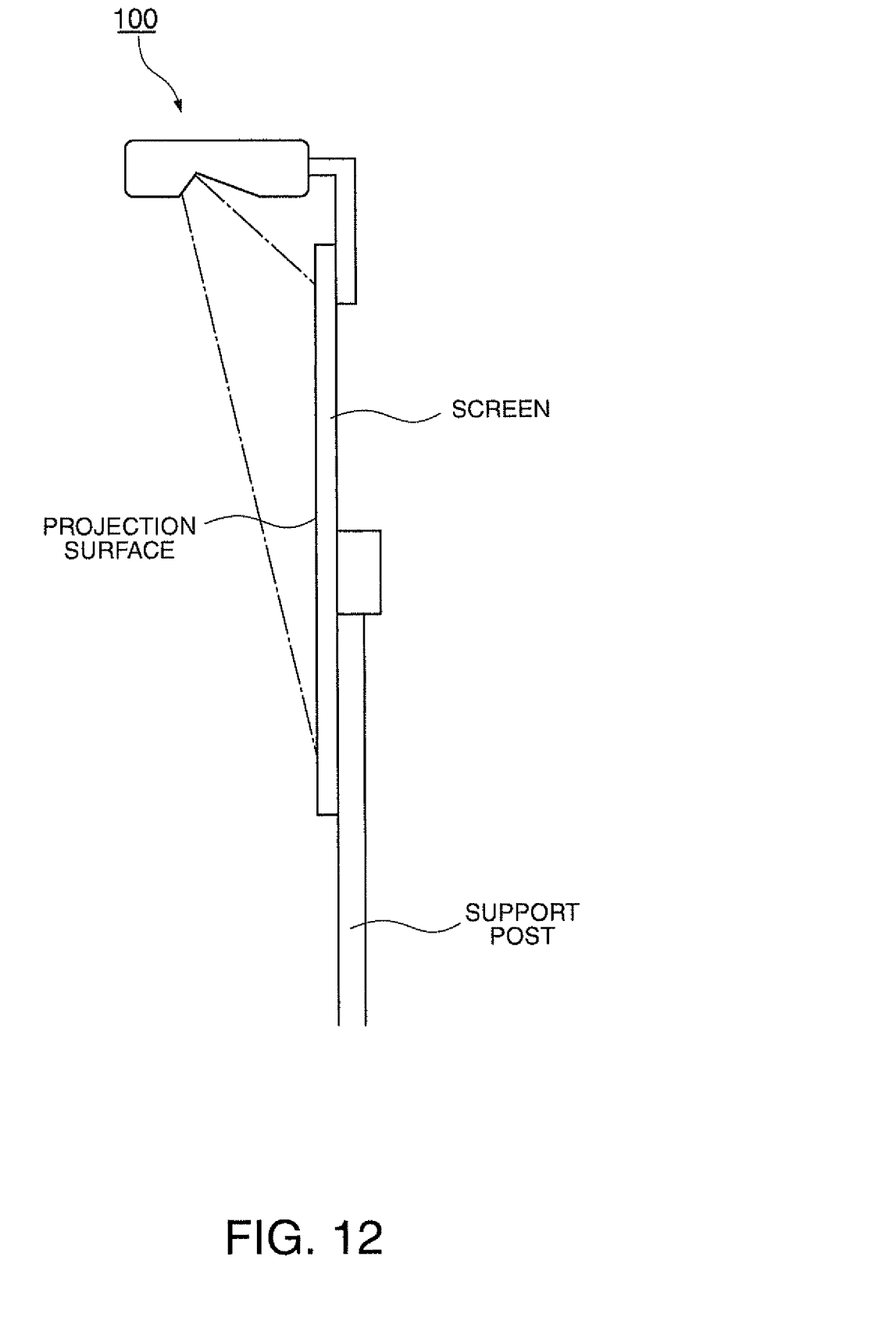
FIG. 12 is a side view illustrating a state where a projection image is projected onto the projection surface of the screen by the use of a top projection type projector.

Although a type of projecting image light onto the projection surface of the screen from the front side has been exemplified as the projector 100 in this embodiment, a top projection type projector being disposed on the top side of the screen as shown in FIGS. 11 and 12 and projecting image light onto the projection surface from the top side may be used as the projector 100. By projecting image light from the top side of the screen in this way, a presenter standing in front of the screen hardly feels dazzling.

Although the handwriting data generating system including a three-panel liquid crystal projector 100 that modulates and projects light from a light source by the use of the liquid crystal light valves as a light modulating unit has been exemplified in this embodiment, the handwriting data generating system according to the invention may employ projectors using other methods. More specifically, a projector employing a projection method using a DMD (Digital Micromirror Device), that is, a so-called DLP (Digital Light Processing) (registered trademark) method may be used. Here, the DLP method is a method of collecting white light of a lamp by a lens and irradiating the DMD, enlarging the light when individual mirrors of the DMD are inclined in the ON state by the use of another lens, and projecting the enlarged light onto the screen. In this embodiment, the handwriting data generating system 10 including the projector 100 projecting an image using a discharge lamp as a light source has been exemplified, but a projector projecting an image using an LED light source or a laser source as a light source may be used.

Although it has been described in this embodiment that the signal from the handwriting device 200 is received by the infrared detector 160 and the ultrasonic detector 170 of the projector 100 and the input position or the pointed-out position on the projection surface by the handwriting device 200 is specified and reflected in the handwriting by the handwriting data generating unit 60 of the PC 50, the handwriting data generating system 10 according to the invention is not limited to this configuration. For example, a screen having an image display function may be used instead of the type of projecting an image onto the screen by the use of the projector 100. In this case, since the projector 100 is not necessary, the infrared detector 160 and the ultrasonic detector 170 disposed in the projector 100 in the above-mentioned embodiment may be disposed in the PC 50. Instead, the infrared detector 160 and the ultrasonic detector 170 may be disposed on the front side or in an edge of the screen and the signals received thereby may be transmitted to the PC 50 via a wire or wirelessly.

For example, the projector 100 may have the functions of the PC 50. That is, a display unit corresponding to the PC display unit 52 may be disposed in the projector 100 and image data may be stored in the storage unit 117. In this case, the operation panel (not shown) disposed in the main body of the projector 100 may have the function corresponding to the PC operation unit 58.

Although the embodiment of the invention has been described, the technical scope of the invention is not limited to the embodiment. It will be apparent to those skilled in the art the embodiment can be modified or improved in various forms.

What is claimed is:

1. A handwriting data generating system comprising:
a handwriting device that is used to handwrite information on a display surface on which an image is displayed, the handwriting device including a battery and being pressed against the display surface when being used to handwrite information; and
a handwriting data generating device that generates handwriting data for displaying handwriting of the handwritten information in a first display format on the display surface,
wherein the handwriting device includes a signal transmitting unit that transmits a change signal indicating a remaining level of the battery to the handwriting data generating device, and the handwriting data generating device includes:
> a handwriting data generating unit that generates the handwriting data; and
>
> a handwriting data changing unit that changes a first portion of the handwriting data so as to display the handwriting that is associated with the first portion on the display surface in a second display format different from the first display format depending on the remaining level of the battery and the received change signal, the first portion beginning upon receipt of the change signal from the handwriting device indicating a decreased remaining level of the battery,
>
> wherein
>
> the handwriting data generating device further includes a cancel signal generating unit that outputs a cancel signal to the handwriting data changing unit when the handwriting device is separated from the display surface, and
>
> the handwriting data changing unit changes the first portion to the first display format in response to the cancel signal, and changes a second portion of subsequent handwriting data so as to display the handwriting that is associated with the second portion on the display surface in the second display format when the change signal continues to indicate the decreased remaining level of the battery, the second portion beginning when the handwriting device is pressed against the display surface again after being separated from the display surface while the first portion continues to be displayed in the first display format.

2. The handwriting data generating system according to claim 1, wherein
> the handwriting data generating device includes a signal receiving unit that receives the change signal, and
>
> the handwriting data changing unit changes the first portion handwriting data on the basis of the of a reception condition of the received change signal.

3. The handwriting data generating system according to claim 1, wherein the handwriting data changing unit changes the first portion of the handwriting data so as to display the handwriting associated with the first portion on the display surface with a different concentration depending on the details of the change signal.

4. The handwriting data generating system according to claim 1, wherein the handwriting data changing unit changes the first portion of the handwriting data so as to display the handwriting associated with the first portion on the display surface in a different linetype depending on the details of the change signal.

5. The handwriting data generating system according to claim 1, wherein the handwriting data changing unit displays a message corresponding to the details of the change signal on the display surface in response to the change of the first portion.

6. The handwriting data generating system according to claim 1, further comprising a projector that projects an image based on input image data onto a projection surface,
> wherein an image obtained by superposing the handwriting data generated by the handwriting data generating unit on the image data is projected onto the projection surface by the use of the projector.

7. A handwriting data generating method of generating handwriting data for displaying handwriting of information which is handwritten by a user of a handwriting device to a display surface on which an image is displayed, the handwriting being displayed in a first display format on the display surface, the handwriting device including a battery and being pressed against the display surface when being used to handwrite information, comprising:
> generating the handwriting data by a handwriting data generating unit;
>
> changing a first portion of the handwriting data so as to display the handwriting associated with the first portion on the display surface in a second display format different from the first display format depending on a remaining level of the battery indicated in a change signal transmitted from the handwriting device to the handwriting data generating unit, the first portion beginning upon receipt of the change signal from the handwriting device indicating a decreased remaining level of the battery,
>
> generating a cancel signal when the handwriting device is separated from the display surface so that the handwriting data generating unit changes the first portion to the first display format in response to the cancel signal; and
>
> changing a second portion of subsequent handwriting data so as to display the handwriting associated with the second portion on the display surface in the second display format when the change signal continues to indicate the decreased remaining level of the battery, the second portion beginning when the handwriting device is pressed against the display surface again after being separated from the display surface while the first portion continues to be displayed in the first display format.

8. The handwriting data generating method according to claim 7, wherein
> the change signal is received, and
>
> the handwriting data first portion is changed on the basis of the of a reception condition of the received change signal.

9. The handwriting data generating method according to claim 7, wherein the first portion of the handwriting data is changed so as to display the handwriting associated with the first portion on the display surface with a different concentration depending on the details of the change signal.

10. The handwriting data generating system according to claim 7, wherein the first portion of the handwriting data is changed so as to display the handwriting associated with the first portion on the display surface in a different linetype depending on the details of the change signal.

11. The handwriting data generating method according to claim 7, wherein a message corresponding to the details of the change signal is displayed on the display surface in response to the change of the first portion.

12. A non-transitory computer program product causing a computer to serve as a handwriting data generating device that generates handwriting data for displaying handwriting of information which is handwritten by a user of a handwriting device to a display surface on which an image is displayed, the handwriting being displayed in a first display format on the display surface, the handwriting device including a battery and being pressed against the display surface when being used to handwrite information, the computer program product comprising:
> a computer program that can be executed by the computer; and
>
> a non-transitory information storage medium that stores the computer program so as to be read by the computer,
>
> wherein the computer program causes the computer to:
> > generate the handwriting data;
> >
> > change a first portion of the handwriting data so as to display the handwriting associated with the first portion on the display surface in a second display format different from the first display format depending on a remaining level of the battery indicated in a change signal transmitted from the handwriting device to the handwriting data generating device, the first portion beginning upon receipt of the change signal from the handwriting device indicating a decreased remaining level of the battery, generate a cancel signal when the handwriting device is separated from the display surface so that the handwriting data generating unit changes the first portion to the first display format in response to the cancel signal; and change a second portion of subsequent handwriting data so as to display the handwriting associated with the second portion on the display surface in the second display format when the change signal continues to indicate the decreased remaining level of the battery, the second portion beginning when the handwriting device is pressed against the display surface again after being separated from the display surface while the first portion continues to be displayed in the first display format.

13. The non-transitory computer program product according to claim 12, wherein the computer program causes the handwriting data changing unit computer to change the handwriting data of the first portion on the basis of the of a reception condition of the received change signal.

14. The non-transitory computer program product according to claim 12, wherein the computer program causes the handwriting data changing unit computer to change the handwriting data of the first portion so as to display the handwriting associated with the first portion on the display surface with a different concentration depending on the details of the change signal.

* * * * *